B. J. LEVIN.
CONNECTED BLOW-OUT PATCH.
APPLICATION FILED JULY 31, 1919.

1,357,784.

Patented Nov. 2, 1920.

WITNESSES
E. A. Wilson
A. L. Kitchin

INVENTOR
Benjamin J. Levin
BY Munn & Co
ATTORNEYS

UNITED STATES PATENT OFFICE.

BENJAMIN J. LEVIN, OF NEW YORK, N. Y.

CONNECTED BLOW-OUT PATCH.

1,357,784.     Specification of Letters Patent.     Patented Nov. 2, 1920.

Application filed July 31, 1919. Serial No. 314,499.

*To all whom it may concern:*

Be it known that I, BENJAMIN J. LEVIN, a citizen of the United States, and a resident of the city of New York, Winfield, borough of Queens, in the county of Queens and State of New York, have invented new and useful Connected Blow-Out Patches, of which the following is a full, clear, and exact description.

This invention relates to a repair or blow out patch for automobile or other tires, and has for an object to provide an improved construction, wherein a strong and accurately fitting patch is provided regardless of the size or shape of the opening to be repaired.

Another object of the invention is to provide a blow out patch member with a number of connected individual patches adapted to be severed for separate use.

A further object of the invention is to provide a blow out patch construction formed from the carcass of tires and constructed to produce patches either of the same or different lengths.

Figure 1:
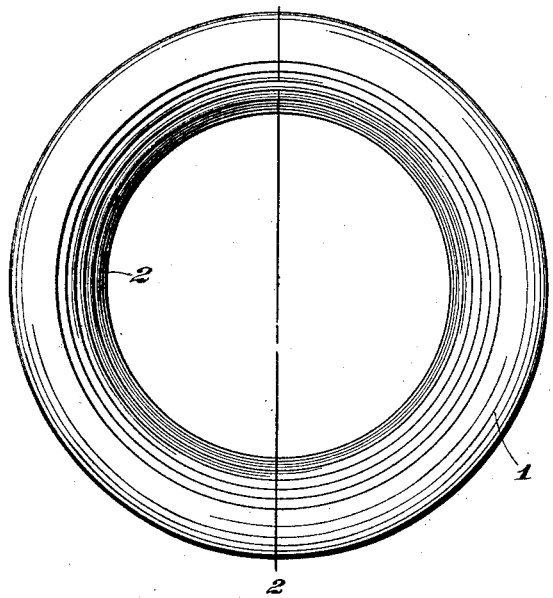
Figure 1 is a side view of a carcass of an automobile tire or shoe.
Figure 2:
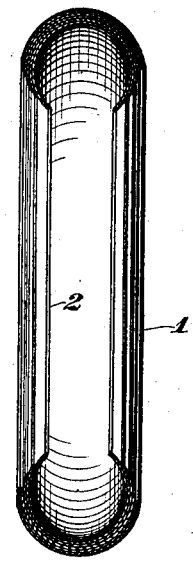
Fig. 2 is a section through Fig. 1 on line 2—2.
Figure 3:
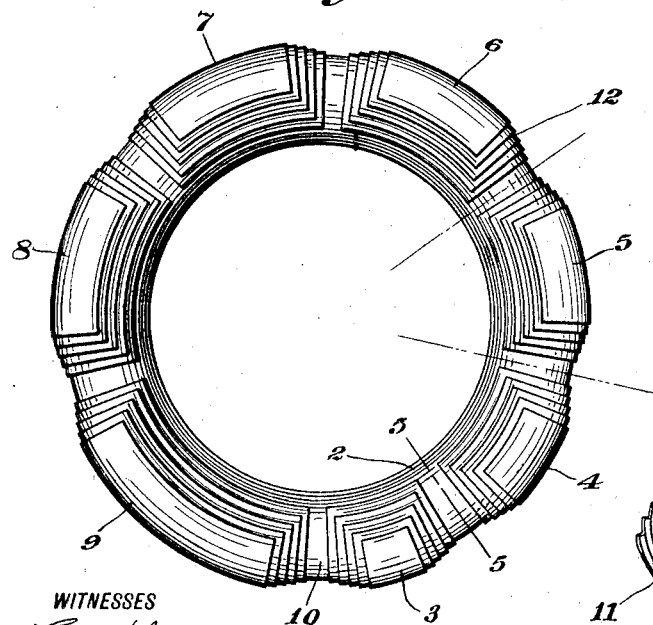
Fig. 3 is a side view of the continuous patch embodying the invention, the same having been contructed from the carcass shown in Fig. 1.
Figure 4:
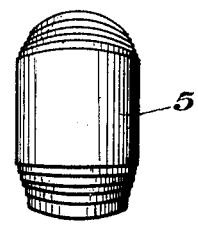
Fig. 4 is a view of one of the patches removed from the continuous patch structure shown in Fig. 3.
Figure 5:
Fig. 5 is a section through Fig. 3 on line 5—5.

Referring to the accompanying drawing by numerals 1 indicates a carcass of an ordinary automobile tire. It will be observed that this carcass is provided with an inner layer 2 of canvas which extends entirely around the interior of the carcass and also in cross section forms almost a circle. Outside of this inner layer there is mounted a plurality of layers in step formation, as shown in Fig. 2, said step layers being annular similar to layer 2. This is the ordinary construction of carcass as now in use. In the present invention it is aimed to construct both large and small patches from a carcass taken from an old tire. After the rubber coating has been removed from the carcass it appears as shown in Fig. 1, the various layers are cut away as shown in Fig. 3 for producing patches 3, 4, 5 6, 7, 8 and 9, said patches being progressive in size so that when a patch is desired the inner layer of canvas 2 is cut at a central point 10 between the respective patches and thereby produces the disconnected patch required shown in Fig. 4. After the continuous patch structure is produced as shown in Fig. 3, it is coated exteriorly with rubber cement and allowed to dry. The characteristic of rubber cement is such that though it is dry, as ordinarily understood in the trade, it has a sticky consistency, and when the patch is placed in position the cement will act as retaining means, for preventing accidental dislocation of the patch.

The various patches are formed with a step construction 12 before the layer 11 of cement is applied, said step construction permitting the use of the desired number of thicknesses of canvas over the blow out or opening, while at the same time producing a tapering edge, which really by reason of the thinness of the layer 2 presents a feather edge to the inner tube. If an abrupt edge of considerable size was presented the inner tube would naturally conform to the shape of said abrupt edge when inflated, but would in a short time wear or break at this point. To obviate this the step construction is made exteriorly of the patch, and a smooth feather edge is produced on the side facing the inner tube, whereby a substantially thin continuous bed is presented to the inner tube while at the same time the opening or hole in the tire is properly covered.

It will be noted from Fig. 3 that the patches are of different sizes so as to accommodate different size blow outs, but if desired a continuous patch construction could be formed with all the patches the same size.

What I claim is:

1. The method of producing patches comprising the removal of the rubber from an old pneumatic tire so as to leave the carcass bare, forming a plurality of independent super-imposed patch sections on the inner layer of said carcass by cutting away parts of the outer layers of said carcass whereby each patch structure will have a plurality of super-imposed layers successively smaller from the inner to the outer layer, and the provision of a coating of rubber cement over said patch structures exteriorly.

2. An article of manufacture comprising an inner annular strip arc-shaped in cross section, a plurality of series of super-imposed strips arranged on the annular strip, the layers of each series of super-imposed strips being succesively shorter circumferentially from the inner to the outer layer, and a coating of rubber cement extending over all of said super-imposed layers and that part of the annular layer connecting said series.

3. An article of manufacture comprising an inner annular strip arc-shaped in cross section, and a plurality of series of superimposed strips arranged on the annular strip, the layers of each series of superimposed strips being successively shorter circumferentially and transversely from the inner to the outer layer.

BENJAMIN J. LEVIN.